United States Patent
Helen et al.

(10) Patent No.: US 10,708,166 B2
(45) Date of Patent: Jul. 7, 2020

(54) METHOD AND A FIRST DEVICE FOR MANAGING DATA FRAMES IN SWITCHED NETWORKS

(71) Applicant: Telefonaktiebolaget LM Ericsson (publ), Stockholm (SE)

(72) Inventors: Per Helen, Saltsjö-Boo (SE); Clarence Ammervik, Alvsjo (SE); Johan Lindstrom, Hägersten (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 365 days.

(21) Appl. No.: 15/518,619

(22) PCT Filed: Nov. 26, 2014

(86) PCT No.: PCT/SE2014/051409
§ 371 (c)(1),
(2) Date: Apr. 12, 2017

(87) PCT Pub. No.: WO2016/085374
PCT Pub. Date: Jun. 2, 2016

(65) Prior Publication Data
US 2017/0230273 A1    Aug. 10, 2017

(51) Int. Cl.
*G06F 15/16*    (2006.01)
*H04L 12/701*   (2013.01)
(Continued)

(52) U.S. Cl.
CPC .............. *H04L 45/00* (2013.01); *H04L 45/28* (2013.01); *H04L 45/66* (2013.01); *H04L 49/10* (2013.01); *H04L 49/552* (2013.01)

(58) Field of Classification Search
CPC . H04L 12/1886; H04L 12/2854; H04L 45/00; H04L 49/351; H04L 12/2856;
(Continued)

(56) References Cited

U.S. PATENT DOCUMENTS 6,032,194 A * 2/2000 Gai ................. H04L 12/462
340/2.1
6,711,171 B1 * 3/2004 Dobbins ........... H04L 12/1886
370/400
(Continued)

FOREIGN PATENT DOCUMENTS

CN    1697445 A    11/2005
CN    102158421 A    8/2011
(Continued)

OTHER PUBLICATIONS

Nadas, S., "Virtual Router Redundancy Protocol (VRRP) Version 3 for IPv4 and IPv6", Internet Engineering Task Force (IETF) Request for Comments: 5798, Obsoletes: 3768, Category: Standards Track, ISSN: 2070-1721, Mar. 2010, pp. 1-40.

*Primary Examiner* — Dustin Nguyen
(74) *Attorney, Agent, or Firm* — Coats & Bennett, PLLC

(57) ABSTRACT

A method and a first device (110) of a switched network (100), for managing data frames received, at a first port, from a second device (120) are disclosed. The first device (110) handles the first port and a second port for transfer of data frames between the first and second devices (110, 120). The first device (110) is addressable by a Media Access Control address, "MAC address", associated with the first port. The first device (110) receives (201), from the second device (120), at least one data frame at the second port. The first device (110) sends (202), on the first port, a message including the MAC address associated with the first port.

11 Claims, 3 Drawing Sheets

(51) Int. Cl.
*H04L 12/703* (2013.01)
*H04L 12/721* (2013.01)
*H04L 12/933* (2013.01)
*H04L 12/939* (2013.01)

(58) Field of Classification Search
CPC ... H04L 12/462; H04L 12/4625; H04L 45/02; H04L 12/40013; H04L 45/18
See application file for complete search history.

(56) References Cited

U.S. PATENT DOCUMENTS

| | | | | |
|---|---|---|---|---|
| 7,602,705 | B1* | 10/2009 | Sivasankaran | H04L 49/351 370/218 |
| 8,611,361 | B2* | 12/2013 | Sugawara | H04L 12/40013 370/401 |
| RE45,454 | E* | 4/2015 | Sivasankaran | H04L 49/351 370/218 |
| 9,282,061 | B1* | 3/2016 | Zoucha | H04L 49/351 |
| 9,621,419 | B2* | 4/2017 | Smith | H04L 12/2854 |
| 2006/0083254 | A1* | 4/2006 | Ge | H04L 12/462 370/401 |
| 2006/0126517 | A1* | 6/2006 | Kurosaki | H04L 45/18 370/241 |
| 2008/0232384 | A1* | 9/2008 | Miyabe | H04L 12/2856 370/401 |
| 2009/0135722 | A1* | 5/2009 | Boers | H04L 45/00 370/236 |
| 2010/0040072 | A1* | 2/2010 | Kitada | H04L 45/18 370/400 |
| 2010/0272108 | A1* | 10/2010 | MacK-Crane | H04L 12/4625 370/392 |
| 2010/0316057 | A1* | 12/2010 | Shiraki | H04L 45/18 370/401 |
| 2014/0064272 | A1 | 3/2014 | Wang et al. | |
| 2015/0237007 | A1 | 8/2015 | Liu et al. | |

FOREIGN PATENT DOCUMENTS

| | | |
|---|---|---|
| CN | 102413052 A | 4/2012 |
| CN | 102710806 A | 10/2012 |

\* cited by examiner

METHOD AND A FIRST DEVICE FOR MANAGING DATA FRAMES IN SWITCHED NETWORKS

TECHNICAL FIELD

Embodiments herein relate to communication systems, such as a switched network. In particular, a method and a first device for managing data frames received, at a first port, from a second device are disclosed. Corresponding computer programs and carriers therefor are also disclosed.

BACKGROUND

A communication system is sometimes conceptually described by an Open Systems Interconnection model (OSI). The model partitions internal functions of the communication system into abstraction layers, such as physical layer (layer 1), data link layer (layer 2), network layer (layer 3), transport layer (layer 4), session layer (layer 5) etc.

An Ethernet network, as an example of a known communication system, is often considered to be part of layer 2. The Ethernet network is also an example of a so called switched network, which uses only network switches rather than network hubs. The difference between network switches and hubs is that hubs forward data frames on all its ports at all times, while the network switches attempts to forward data frames only on those ports that are relevant for a certain data frame.

The Ethernet network comprises a first host and a second host that communicates with each other using unique MAC addresses to identify the first and second hosts, respectively. The first host may be a router and the second host may be a Personal Computer (PC), or vice versa.

The Ethernet network also comprises a number of network switches for forwarding data frames, i.e. constituting the communication between the first and second hosts, within the Ethernet network towards the first and/or second host. The data frames are Media Access Control (MAC) data frames, which include a destination MAC address field and a source MAC address field. See e.g. Institute of Electrical and Electronics Engineers (IEEE) 802.3 specifications.

When a network switch receives a data frame, it looks up a destination MAC address, located in the destination MAC address field of the received data frame, in a so called MAC address table in order to find out at which port of the network switch the received data frame should be feed. Thus, the MAC address table maps, or associates, a MAC address to a port of the network switch.

Additionally, the network switch checks the source address field of the received data frame and notes at which port the received data frame was received. This means that the network switch checks if the MAC address in the source address field of the received data frame is not present, or mapped to another port, in the MAC address table of the network switch. Then, i.e. when the MAC address table needs to be updated due to either not present or mapping to another port, the source address and the port, at which the data frame was received, is put into the MAC address table for future use. This process of populating the MAC address table is sometimes referred to as MAC learning.

Moreover, when the destination MAC address is not found in the MAC address table, the network switch forwards the received data frame to additional ports, excluding the port at which the received data frame was received. This creates additional traffic, due to data frames being forwarded to the additional ports of the network switch, in the Ethernet network. When these data frames are received at e.g. the first host, and the first host cannot find its own MAC address in the destination MAC address field of the data frames, the first host is said to be flooded. Accordingly, the network switch is flooding data frames.

The first host can send request messages to check for the existence of a MAC address belonging to the second host. This can be done by the first host in order to keep its Address Resolution Protocol (ARP) tables updated. ARP is used to convert an Internet Protocol (IP) address to a physical address, such as an Ethernet address, also known as a MAC address. The request messages are sent periodically, e.g. every 5th minute.

Continuing with the example above, the first host can have a redundant L2 connection towards the network switches. The redundant L2 connection is build up by a first port of first host towards a first network switch and a second port of the first host towards a second network switch. This set up is called redundant because only one of the first and second ports is used at the time. There will thus be one active port and one passive port at the first host.

When the first host sends data frames to the second host, these data frames include a MAC address of the active port in the source MAC address field. Thus, the network switches are able to learn the MAC address mapped to the active port.

A failure, such as that a network switch goes down, may happen in the Ethernet network. Another switch will then no longer be able to forward data frames, intended for the first host, at the port connected to the network switch that went down. Thus, flooding will occur due to that the MAC address table lacks information about which port the data frames should be forwarded to for the given destination MAC address. See also FIG. 1b below.

A problem is that flooding occurs for a long time in the Ethernet network when data frames are forwarded in one direction, or is considered to be unidirectional. The flooding will proceed until the first host sends a message with its own MAC address in the source MAC address field, e.g. in response to the periodically sent request message, which is mentioned above. In order to shorten the time during which flooding occurs, the periodicity of the request message may be shortened. However, a shortened periodicity implies an increase of request messages, which take up valuable network resources which otherwise could be used for data frame carrying payload data.

SUMMARY

An object may be to alleviate, or at least reduce, the above mentioned problem.

According to a first aspect, the object is achieved by a method, performed by a first device of a switched network, for managing data frames received, at a first port, from a second device. The first device handles the first port and a second port for transfer of data frames between the first and second devices. The first device is addressable by a Media Access Control address, "MAC address", associated with the first port. The first port is used by the first device when sending data frames. The first device receives, from the second device, at least one data frame at the second port. The first device sends, on the first port, a message including the MAC address associated with the first port.

According to a second aspect, the object is achieved by a first device of a switched network configured to manage data frames received, at a first port, from a second device. The first device handles the first port and a second port for transfer of data frames between the first and second devices.

The first device is addressable by a Media Access Control address, "MAC address", associated with the first port. The first port is used by the first device when sending data frames. The first device is configured to receive, from the second device, at least one data frame at the second port. Furthermore, the first device is configured to send, on the first port, a message including the MAC address associated with the first port.

According to further aspects, the object is achieved by a computer program and a carrier for the computer program corresponding to the aspects above.

When the first device receives, e.g. detect flooding, at the second port, at least one data frame, it is a sign of that an error in the switched network has occurs. The at least one data frame may be provided with a MAC address associated with the first port.

Accordingly, there is an error since the at least one data frame was in fact received at the second port, when it should have been received at the first port according to the destination address field of the at least one data frame. Therefore, thanks to that the first device sends, at the first port, the message including the MAC address associated with the first port, any existing network switches in the switched network are able to learn the MAC address of the first port. Thus, flooding of data frames will cease.

An advantage is thus the flooding is stopped quickly, whereby data frames may instead be used for carrying payload data.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1A:
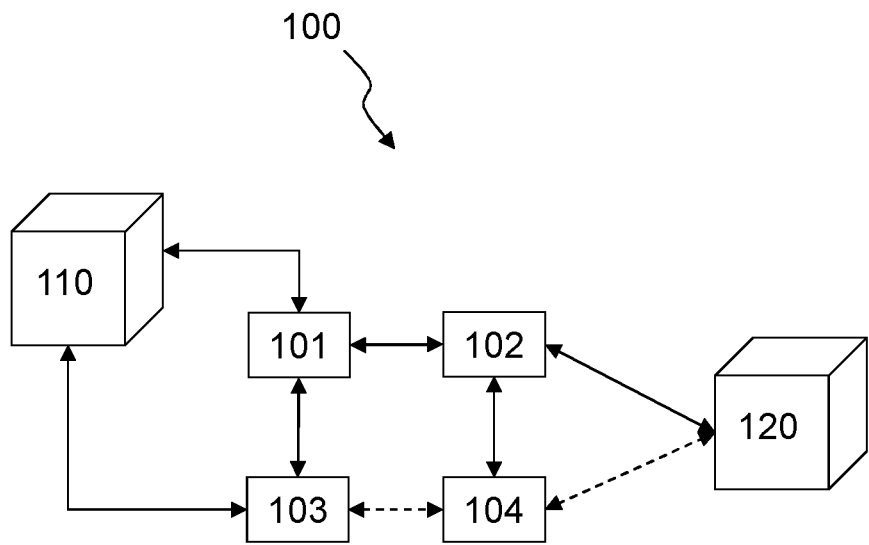
FIGS. 1a and 1b are schematic overviews of an exemplifying Ethernet network in which embodiments herein may be implemented.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

FIG. 1a depicts an exemplifying communication system in which embodiments herein may be implemented. In this example, the communication system is a switched network 100. As an example, the switched network 100 may be an Ethernet network, a Layer 2 network or the like.

The switched network 100 comprises a first device 110 and a second device 120. The first device 110 may include, or have, a first port and the second device 120 may include, or have, a second port.

As used herein, the term "device" may refer to a Personal Computer (PC), a laptop, a cellular phone, a tablet PC, a smartphone, a user equipment, a server, a client, a router and the like.

The switched network 100 further comprises a number of network switches 101-104.

Traffic, e.g. data frames, between the first device 110 and the second device 120 passes through network switches denoted by 101, and 102.

In the Figure, each device, e.g. network switch, device, host, client etc., is assumed to have one port at each side. The solid arrows indicate communication links to which ports are open and dashed arrows indicate communication links to which ports are closed.

Figure 1B:
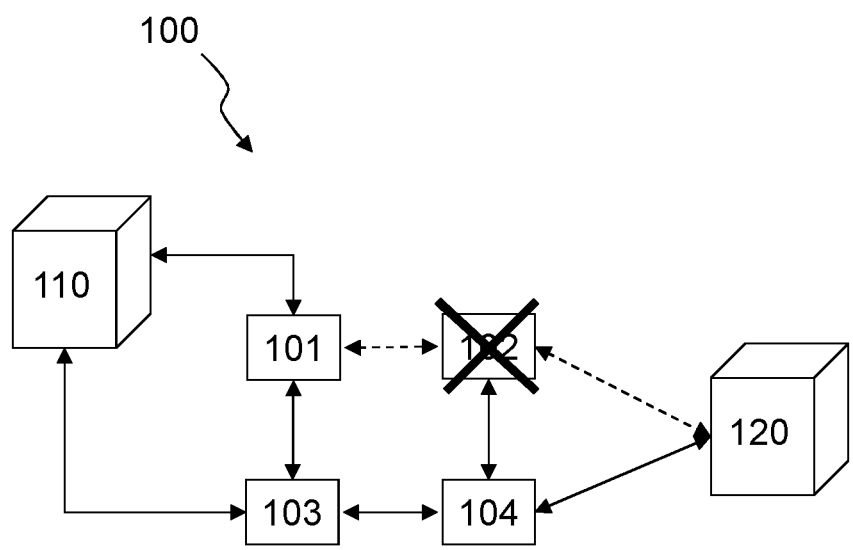

Now turning to FIG. 1b, there is illustrated a scenario in which the network switch 102 has a failure, e.g. power interruption, hardware malfunction, restart of network switch, failure of link to network switch, manual blocking by configuration of ports or the like. Now that there is a failure, traffic needs to find a new way of passing between the first device 110 and the second device 120. The traffic may for example pass through the network switches denoted by 101, 103, and 104.

When the failure has occurred, network switch 104 will flood, e.g. forward, any incoming data frames from the second device 120 to all its ports, except for the one towards the failed network switch 102. Similarly, network switch 103 will flood any incoming data frames. Thus, the first device 110 will unexpectedly receive data frames, on the second port, wherein the data frames are addressed to e.g. the first device 110 on the first port.

Figure 2:
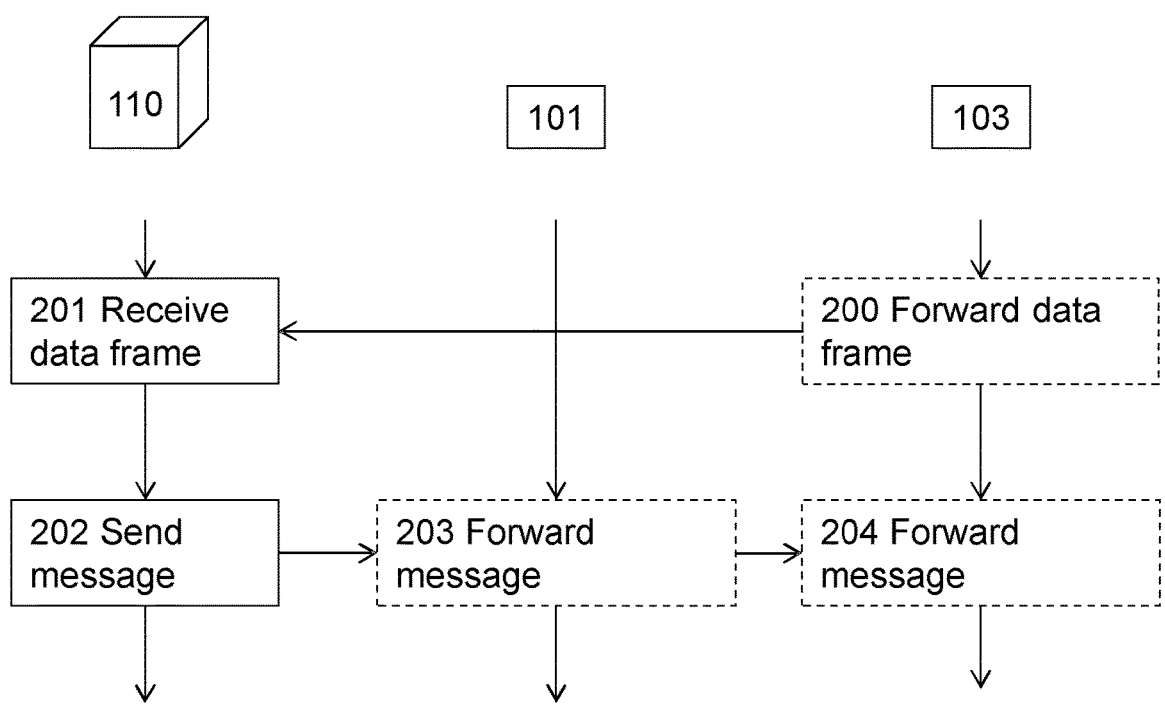
FIG. 2 is a schematic combined signaling and flowchart illustrating embodiments herein.

FIG. 2 illustrates an exemplifying method according to embodiments herein when performed in connection with the switched network 100 of FIG. 1. Accordingly, the first device 110 of the switched network 100 performs a method for managing data frames received, at the first port, from a second device 120, wherein the first device 110 handles the first port and a second port for transfer of data frames between the first and second devices 110, 120. The first device 110 is addressable by a Media Access Control address, "MAC address", associated with the first port. The first port is used by the first device 110 when sending data frames. The term "MAC address" may more generally be referred to as a link layer address. Accordingly, any future switched network in which the link layer address are referred to something else than MAC addresses is considered to be within the scope of the present disclosure.

The first port may be a first physical port of the first device 110, and the second port may be a second physical port of the first device 110.

The data frames may be MAC data frames, Ethernet frames, switched network frames or similar.

The first port may be an active port and the second port may be a passive port, whereby the first device 110 is capable of handling redundancy in the switched network 100. The active port and the passive port may be handled by the first device 110 in accordance with a scheme having functions and purposes similar to VRRP, which exists for managing of routers.

In some examples, the switched network 100 includes one or more virtual networks, such as a Virtual Local Area Networks (VLAN). Hence, the first port may be a first logical port associated to the VLAN, i.e. an identifier of the VLAN, and the second port may be a second logical port associated to the VLAN. Then, the first port and the second port may be associated to the first and second logical ports, respectively. In the case of VLAN, the first and second logical ports are mapped to different physical ports of the first device 110.

The following actions may be performed in any suitable order.

Action 201

The first device 110 receives, from the second device 120, at least one data frame at the second port. Expressed differently, the first device 110 detects flooding of data frames at the second port.

Action 202

This action may be performed in response to action 201. The first device 110 sends, on the first port, a message including the MAC address associated with the first port.

The sending 202 of the message may be performed only when the received at least one data frame comprises a destination address field, which includes the MAC address associated with the first port. Thus, the received at least one data frame is filtered with respect to the destination address, where only those data frames including a destination address field that include the MAC address associated with the first port are of interest. A reason for that is that action 202 is able to remedy such error.

In some examples, in order to avoid that action 202 is performed excessively, i.e. much more than necessary, the message may only be sent less than a specific number of times counted from when action 201 was performed, i.e. flooding was detected at the first device 110, e.g. at the second port of the first device 110. Accordingly, action 202 may imply that the first device 110 sends, on the first port, one or more messages including the MAC address associated with the first port, e.g. one or more of the message mentioned in the first sentence of the description of this action.

Figure 3:
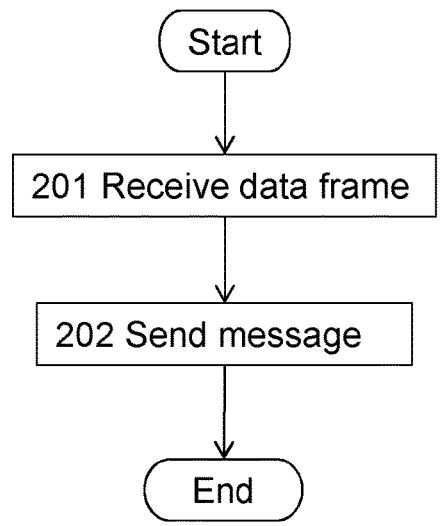
FIG. 3 is a flowchart illustrating embodiments of the method in the first device.

In FIG. 3, a schematic flowchart of exemplifying methods in the first device 110 is shown. Again, the same reference numerals as above have been used to denote the same or similar features, in particular the same reference numerals have been used to denote the same or similar actions. Accordingly, the first device 110 of the switched network 100 performs a method for managing data frames received, at a first port, from a second device 120.

As mentioned, the first device 110 handles the first port and a second port for transfer of data frames between the first and second devices 110, 120. The first device 110 is addressable by a Media Access Control address, "MAC address", associated with the first port. The first port is used by the first device 110 when sending data frames. The first port may be a first physical port, and the second port may be a second physical port.

The first port may be a first logical port and the second port may be a second logical port when the switched network 100 includes a virtual network, such as a VLAN. Then, the first and second logical ports are associated to the virtual network, e.g. an identifier of the virtual network.

The following actions may be performed in any suitable order.

Action 200

Due to the failure described in FIG. 1b, network switch 103 forwards data frames with a destination address field including a MAC address associated with the first port to all its port, i.e. the network switch 103 floods these data frames. In particular, this means that the network switch 103 also forwards the data frame to some port that is connected to the second port of the first device 110. A reason for this is that the network switch 103 does not have a port that is associated with the MAC address of the first device's 110 first port.

Action 201

The first device 110 receives, from the second device 120, at least one data frame at the second port. Expressed differently, the first device 110 detects flooding of data frames at the second port.

Action 202

This action may be performed in response to action 201. The first device 110 sends, on the first port, a message including the MAC address associated with the first port. The message may be an ARP message, such as a gratuitous ARP (grat-ARP) message, Internet Control Message Protocol (ICMP) ping, L2 broadcast message or the like.

The sending 202 of the message may be performed only when the received at least one data frame comprises a destination address field, which includes the MAC address associated with the first port.

The sending 202 of the message may be performed less than a specific number of times counted from the receiving 201 of the at least one data frame.

The first port may be an active port and the second port may be a passive port, whereby the first device 110 is capable of handling redundancy in the switched network 100.

Action 203

When action 202 has been performed, network switch 101 may receive the message. The message may typically be addressed as a broadcast or multicast message. Therefore, the network switch 101 may forward, or feed, the message to all its ports, i.e. including a port towards network switch 103.

When the network switch 101 receives the message, it may note that the source address of the message is already in a MAC table handled by the network switch 101.

Action 204

Upon reception of the message, the network switch 103 checks its MAC table and concludes that the source address of the message is not found. Thus, the network switch 103 updates its MAC address table by associating the source address of the message to the port at which the message was received. Accordingly, when a subsequent data frame is received from e.g. the second device 120, which data frame has a destination address field including the MAC address of the first port of the first device 110, the network switch 103 will know to which port the data frame should be forwarded. Hence, flooding is stopped, or does not occur.

Figure 4:
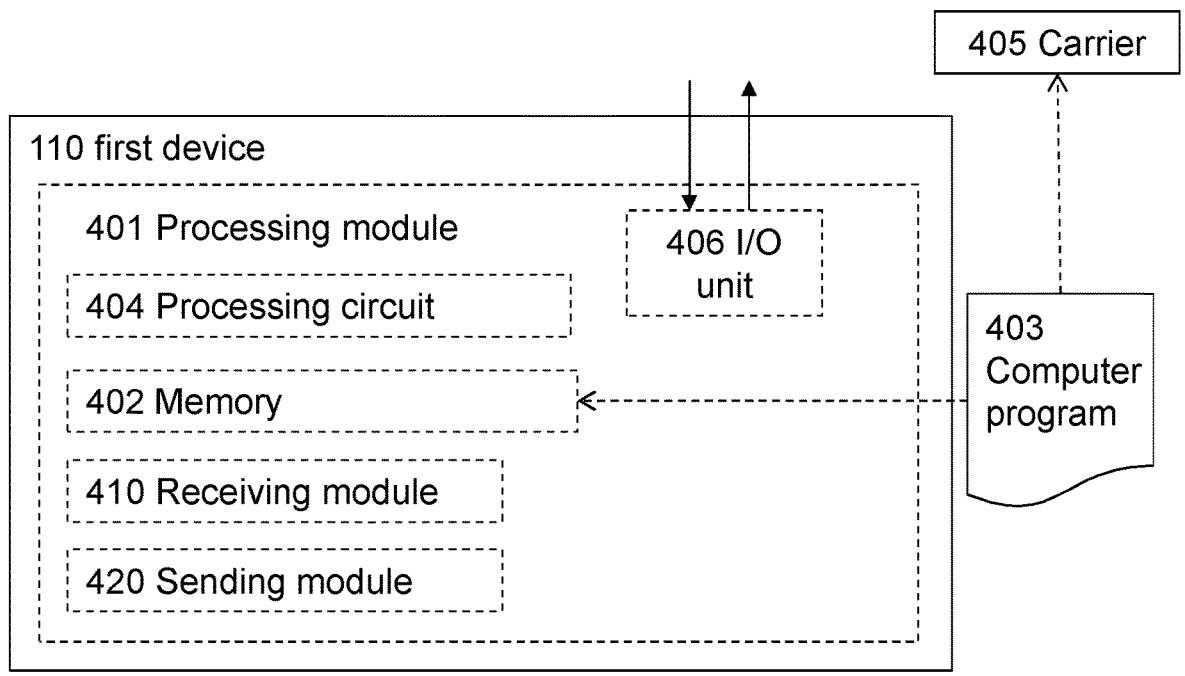
FIG. 4 is a block diagram illustrating embodiments of the first device.

With reference to FIG. 4, a schematic block diagram of embodiments of the first device 110 of FIG. 1 is shown. The first device 110 of the switched network 100 is thus configured to manage data frames received, at a first port, from a second device 120.

As mentioned, the first device 110 handles the first port and a second port for transfer of data frames between the first and second devices 110, 120. The first device 110 is addressable by a Media Access Control address, "MAC address", associated with the first port. The first port is used by the first device 110 when sending data frames.

Again, the first port may be an active port and the second port may be a passive port, whereby the first device 110 may be capable of handling redundancy in the switched network 100. The first port may be a first physical port, and the second port may be a second physical port. The first port may be a first logical port and the second port may be a second logical port.

The first device 110 may comprise a processing module 401, such as a means, one or more hardware modules and/or one or more software modules for performing the methods described herein.

The first device 110 may further comprise a memory 402. The memory may comprise, such as contain or store, a computer program 403.

According to some embodiments herein, the processing module 401 comprises, e.g. 'is embodied in the form of' or 'realized by', a processing circuit 404 as an exemplifying hardware module. In these embodiments, the memory 402 may comprise the computer program 403, comprising computer readable code units executable by the processing circuit 404, whereby the first device 110 is operative to perform the methods of FIG. 2 and/or FIG. 3.

In some other embodiments, the computer readable code units may cause the first device 110 to perform the method according to FIGS. 2 and/or 3 when the computer readable code units are executed by the virtual router master 110.

FIG. 4 further illustrates a carrier 405, comprising the computer program 403 as described directly above. The carrier 405 may be one of an electronic signal, an optical signal, a radio signal, and a computer readable medium.

In some embodiments, the processing module 401 comprises an Input/Output unit 406, which may be exemplified by a receiving module and/or a sending module as described below when applicable.

In further embodiments, the processing module 401 may comprise one or more of a receiving module 410, and a sending module 420 as exemplifying hardware modules. In other examples, one or more of the aforementioned exemplifying hardware modules may be implemented as one or more software modules.

Therefore, according to the various embodiments described above, the first device 110 is operative to and/or the first device 110, the processing module 401 and/or the receiving module 410 is configured to receive, from the second device 120, at least one data frame at the second port.

Furthermore, the first device 110 is operative to and/or the first device 110, the processing module 401 and/or the sending module 420 is configured to send, on the first port, a message including the MAC address associated with the first port.

The first device 110 may be operative to and/or the first device 110, the processing module 401 and/or the sending module 420 may be configured to send the message only when the received at least one data frame comprises a destination address field, which includes the MAC address associated with the first port.

The first device 110 may be operative to and/or the first device 110, the processing module 401 and/or the sending module 420 may be configured to send the message less than a specific number of times counted from the when the at least one data frame was received.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a first device of a switched network, the method comprising:
   receiving first and second data frames from a second device at first and second ports of the first device, respectively, wherein the second data frame is a next data frame received from the second device after the first data frame; and
   responsive to receiving the second data frame at a different port from the first data frame, sending, on the first port, a message comprising a Media Access Control (MAC) address associated with the first port, wherein the first device is addressable by the MAC address.

2. The method of claim 1, wherein the sending the message is performed only when the received second data frame comprises a destination address field that includes the MAC address associated with the first port.

3. The method of claim 2, wherein the sending the message is performed less than a specific number of times counted from the receiving of the second data frame.

4. The method of claim 1, wherein the first port is an active port and the second port is a passive port, whereby the first device is capable of handling redundancy in the switched network.

5. The method of claim 1, wherein the first port is a first physical port and the second port is a second physical port.

6. A first device of a switched network, wherein the first device comprises:

processing circuitry;

memory containing instructions executable by the processing circuitry whereby the first device is configured to:

receive first and second data frames from a second device at first and second ports of the first device, respectively, wherein the second data frame is a next data frame received from the second device after the first data frame; and responsive to receiving the second data frame at a different port from the first data frame, send, on the first port, a message comprising a Media Access Control (MAC) address associated with the first port, wherein the first device is addressable by the MAC address.

7. The first device of claim 6, wherein the instructions are such that the first device is configured to send the message only when the received second data frame comprises a destination address field that includes the MAC address associated with the first port.

8. The first device of claim 7, wherein the instructions are such that the first device is configured to send the message less than a specific number of times counted from the when the second data frame was received.

9. The first device of claim 6, wherein the first port is an active port and the second port is a passive port, whereby the first device is capable of handling redundancy in the switched network.

10. The first device of claim 6, wherein the first port is a first physical port and the second port is a second physical port.

11. A non-transitory computer readable recording medium storing a computer program product the computer program product comprising software instructions which, when run on processing circuitry of the first device, causes the first device to:

receive first and second data frames from a second device at first and second ports of the first device, respectively, wherein the second data frame is a next data frame received from the second device after the first data frame; and responsive to receiving the second data frame at a different port from the first data frame, send, on the first port, a message comprising a Media Access Control (MAC) address associated with the first port, wherein the first device is addressable by the MAC address.

* * * * *